(12) United States Patent
Kumar

(10) Patent No.: US 8,015,292 B2
(45) Date of Patent: Sep. 6, 2011

(54) SYSTEM AND METHOD FOR CONNECTING CONSUMERS WITH A DIVERSE SET OF CONSULTANTS AND EXPERTS

(76) Inventor: Gopesh Kumar, Pleasanton, CA (US)

( * ) Notice: Subject to any disclaimer, the term of this patent is extended or adjusted under 35 U.S.C. 154(b) by 1243 days.

(21) Appl. No.: 10/710,795

(22) Filed: Aug. 3, 2004

(65) Prior Publication Data

US 2006/0031516 A1 Feb. 9, 2006

(51) Int. Cl.
*G06F 15/16* (2006.01)
(52) U.S. Cl. .......... 709/227; 709/202; 709/230; 705/38; 705/40; 379/114; 379/265
(58) Field of Classification Search .................. 709/202, 709/227, 230; 379/265, 114; 705/412, 40, 705/38
See application file for complete search history.

(56) References Cited

U.S. PATENT DOCUMENTS

| | | | | |
|---|---|---|---|---|
| 5,577,100 A * | 11/1996 | McGregor et al. | ............. | 455/406 |
| 6,058,173 A * | 5/2000 | Penfield et al. | .......... | 379/114.17 |
| 6,463,149 B1 * | 10/2002 | Jolissaint et al. | ........ | 379/265.09 |
| 6,493,437 B1 * | 12/2002 | Olshansky | ............... | 379/114.13 |
| 6,677,100 B2 * | 1/2004 | Kim et al. | .................. | 430/270.1 |
| 6,907,116 B2 * | 6/2005 | Ung et al. | ................. | 379/114.16 |
| 7,289,612 B2 * | 10/2007 | Lurie et al. | .................. | 379/114.1 |
| 7,289,623 B2 * | 10/2007 | Lurie | ........................ | 379/221.02 |
| 2002/0010608 A1 * | 1/2002 | Faber et al. | ........................ | 705/8 |
| 2002/0103693 A1 * | 8/2002 | Bayer et al. | ...................... | 705/10 |
| 2002/0111907 A1 * | 8/2002 | Ling | ............................... | 705/41 |
| 2004/0122941 A1 * | 6/2004 | Creamer et al. | .............. | 709/224 |
| 2004/0252820 A1 * | 12/2004 | Faber et al. | .............. | 379/201.12 |
| 2005/0086290 A1 * | 4/2005 | Joyce et al. | .................... | 709/202 |

\* cited by examiner

*Primary Examiner* — John Follansbee
*Assistant Examiner* — Anthony Mejia
(74) *Attorney, Agent, or Firm* — White-Welker & Welker, LLC; Matthew T. Welker, Esq.

(57) ABSTRACT

It is the objective of the current invention to provide a system that will allow Users to contact Service Providers in specific fields. The User will choose a Service Provider via an Internet-based icon from within any one of a broad base of Internet interfaces maintained by the system or the Service Provider. Once a Service Provider is chosen, a pop-up window will appear telling that User if the Service Provider is available. If the Service Provider is available the system will connect the User with the Service Provider. If the Service Provider is unavailable the system will prompt the User to try again later or send an e-mail to the Service Provider.

17 Claims, 13 Drawing Sheets

Click4Advisor™
Get Instant Advice from Expert Advisors!

Click4Advisor - Where Questions Meet Answers

Click4Advisor Service Free Demo

Whether you plan to be an Advisor or a User seeking advice, you can try a free demo of the service and talk to our service reps. Just click on the button below and enter your phone number:

[ Click here for a free demo! ]

Are you an expert?

If you are an expert in your field or topic, click here to sign up as an advisor.

Start earning money for your expert advice today.

Benefits

Click4Advisor enables Advisors to offer their expertise to clients (Users) over the telephone in a secure and private, paid and metered environment. Click4Advisor allows Users to review Advisors' profiles, feedback from other Users, and ratings before calling and ensures a successful and secure connection.

There is no fee to offer Click4Advisor service but when you provide advice services, we charge a small service fee. Please feel free to give us a demo call, if you have further questions. Or just click here to register as an Advisor or here to register as a User.

Help & Information Area

How do I use Click4Advisor to get expert advice?

How do I signup as a User?

How do I signup as an Advisor?

How do I earn money as an Advisor?

Home | Legal Notices | Copyright | Privacy Policy | User Agreement | Advisor Agreement | Contact Us

Figure 2

Choose a category

Business
Accounting : Career : Consulting : Finance : Legal : Tax : Other

Technical
ASP Programming : PHP Programming : Visual Basic : Java Programming : Hardware : Internet : Multimedia : Networking : Software : Windows : Other : Support Help Desk

Personal
Coaching : Education : Finance : Health & Fitness : Legal : Tax : Other

Metaphysical
Astrology/Horoscope : Numerology : Psychics : Tarot Reading : Other

Figure 3a

Advisor: rg2
Rate Per Minute: $1.00

Advisor Profile/Feedback    Email to Advisor

Privacy Statement    How does it work?

You current balance is $49.62. It will allow you to talk for 49 minutes. To add more money to your account click here.

Click on the 'Call on Phone' button to connect to your Advisor right now.

Call on Phone service by: Click4Advisor™    powered by: ZiffTalk

Fig. 3d

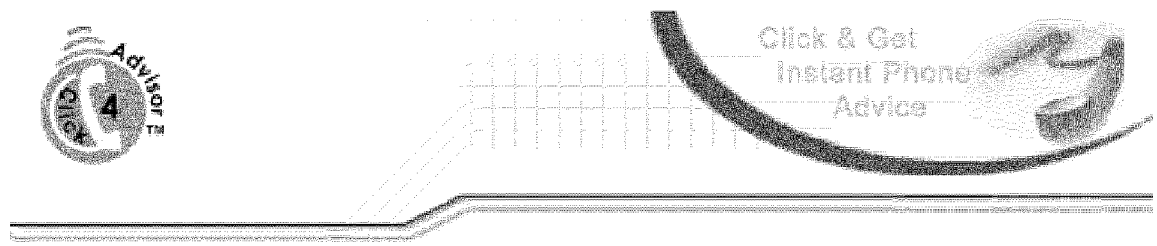
You will receive a call right now.
Time left for this call is 48 minutes
Click Here to Make a Deposit*
* Your deposit will be credited toward future calls, but not to this current call.
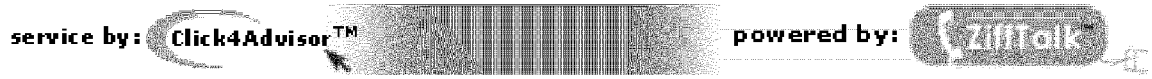
Figure 3e

Click4Advisor – Advisor Not Available

Click4Advisor Member Web Interface

Logged as: rgS [Logout]

| Usage Transactions | Deposit Transactions | Messages | User Profile | Help |

Usage Information | Make Deposit

Usage Information

The current balance is $49.62

From                           To                              Feedback            Advisor Payout Id
[1] [Dec] [2003]    [30] [Jul] [2004]    [All]    [All]    [Search]

Usage Information for December 01, 2003 - July 30, 2004 [Download as .csv file]

| Id | Date/Time | Advisor Name | Service Description | Call Duration | Amount Charged | Advisor Payout Id | Status | Feedback | Details |
|---|---|---|---|---|---|---|---|---|---|
| 242 | July 28, 2004 08:23PM | rg2 | Expert in Desktop Programming | 1 | $1.00 | | Completed | Waiting | More... |
| 241 | July 28, 2004 08:15PM | rg2 | Expert in Desktop Programming | 2 | $2.00 | | Completed | Waiting | More... |
| 240 | July 28, 2004 08:00PM | rg2 | Expert in Desktop Programming | 2 | $2.00 | | Completed | Waiting | More... |
| 226 | July 28, 2004 03:44PM | rg2 | Expert in Desktop Programming | 1 | $0.00 | | Completed | Waiting | More... |
| 223 | July 28, 2004 02:31PM | rg2 | Expert in Desktop Programming | 1 | $1.05 | | Completed | Waiting | More... |
| 222 | July 28, 2004 02:00PM | rg2 | Expert in Desktop Programming | 2 | $2.10 | | Completed | Waiting | More... |

Fig. 7

SYSTEM AND METHOD FOR CONNECTING CONSUMERS WITH A DIVERSE SET OF CONSULTANTS AND EXPERTS

BACKGROUND OF INVENTION

1. Field of the Invention

The present invention relates to techniques for delivering information electronically, more particularly, for enabling expert Service Providers to deliver, and charge for, advice to consumers.

2. Description of Prior Art

The World Wide Web is currently a subject of intense and rapidly growing interest. The World Wide Web is composed of interconnected data sources that are accessible to computer Users through data-communication networks such as the Internet. The data available on the World Wide Web has been assembled by private individuals, commercial companies, government agencies, and special interest organizations. Much of this assembled information is organized into Web pages. A Web site is a collection of Web pages (and possibly other data which, together with Web pages, are generically referred to as Web components) offered by a sponsoring entity, herein referred to as the site owner.

Large Web sites are typically organized hierarchically. For example, corporate Web sites often consist of smaller Web sites, each providing information about a business unit of the parent company.

The Web site itself resides on one or more server hosts. Web components stored on the server host are offered to Users of the World Wide Web through a software program known as a Web server. A network User uploads or downloads data from a Web site through a browser, a software program running on the client host. The browser establishes contact with the Web server and issues a request for data stored on the server host. This results in data from the server host being downloaded into the browser. This data is typically a HyperText document specifying information required by the browser to display the Web page (i.e., formatting information specifying the structure of the page, or URLs of images that are to be placed on the page), embedded client software programs which run inside the browser (e.g., Java bytecode), and other content to be downloaded to the client computer or displayable through client software programs that add to the browser's functionality (sometimes referred to as "browser plug-ins").

Currently, Web pages are typically defined using HyperText Markup Language ("HTML"). HTML provides a standard set of tags that define how a Web page is to be displayed. When a User indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

As more and more demand, and the use of technology enter peoples' lives, there exists a great need for people to be able to contact experts and Service Providers easily and quickly on any topic or subject via the Internet. While many companies have web pages and/or telephone support lines, most do not offer the most convenient and integrated way for potential clients to reach them, nor a simple, automated, yet comprehensive method for charging for their services.

There is a need for a system, especially an Internet-based system, that will enable customers to easily and quickly connect to Service Providers from Internet-based icons located in a broad collection of vehicles such as individual websites, website directories, emails, or online advertisement banners, so that these Service Providers can reach and assist these customers with their questions, in return for fair and agreed-upon payment.

There is still much room for improvement in the art.

SUMMARY OF INVENTION

It is the objective of the current invention to provide a system that will enable Users to contact Service Providers from various Internet interfaces by communications vehicles such as voice telecommunications. The User will choose to contact a Service Provider from an Internet-based icon located in an individual website, a directory website, an email, an online advertisement banner, or any other Internet User interface. Once a Service Provider is chosen, a pop-up window will appear telling that User if the Service Provider is available. If the Service Provider is available the system will connect the User with the Service Provider. If the Service Provider is unavailable the system will allow the User to send an e-mail to the Service Provider.

The current invention utilizes the Internet. The Internet comprises a vast number of computers and computer networks that are interconnected through communication links. The interconnected computers exchange information using various services, such as electronic mail, Gopher, and the World Wide Web ("WWW"). The WWW service allows a server computer system (i.e., Web server or Web site) to send graphical Web pages of information to a remote client computer system. The remote client computer system can then display the Web pages. Each resource (e.g., computer or Web page) of the WWW is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer system receives that Web page, it typically displays the Web page using a browser. A browser is a special-purpose application program that affects the requesting of Web pages and the displaying of Web pages.

The system provides a more efficient practical and functional method to enable Users to contact Service Providers for expert advice and Service Providers to promote and offer their services to and transact their services with consumers than the current art.

Definitions:

Agent: a Service Provider or a grouping of Service Providers that individually or collectively employ the System within their websites or other Internet-based displayed and/or published materials.

Browser: a software program that runs on a client host and is used to request Web pages and other data from server hosts. This data can be downloaded to the client's disk or displayed on the screen by the browser.

Client host: a computer that requests Web pages from server hosts, and generally communicates through a browser program.

Content provider: a person responsible for providing the information that makes up a collection of Web pages.

Embedded client software programs: software programs that comprise part of a Web site and that get downloaded into, and executed by, the browser.

Host: a computer that is connected to a network such as the Internet. Every host has a hostname (e.g., mypc.mycompany-.com) and a numeric IP address (e.g., 123.104.35.12).

HTML (HyperText Markup Language): the language used to author Web Pages. In its raw form, HTML looks like normal text, interspersed with formatting commands. A browser's primary function is to read and render HTML.

HTTP (HyperText Transfer Protocol): protocol used between a browser and a Web server to exchange Web pages and other data over the Internet.

HyperText: text annotated with links to other Web pages (e.g., HTML).

Internet-Based Icon: a graphical or text icon that is linked to this system's database and enables the initiation of contact between the Service Provider and the consumer, which is located anywhere throughout the Internet including but not limited to websites, emails, directory listings, and advertisement banners IP (Internet Protocol): the communication protocol governing the Internet.

Server host: a computer on the Internet that hands out Web pages through a Web server program.

Service Provider: one who is providing advice through this system to Users or consumers. Also known as an Expert or an Advisor.

URL (Uniform Resource Locator): the address of a Web component or other data. The URL identifies the protocol used to communicate with the server host, the IP address of the server host, and the location of the requested data on the server host. For example, "http://www.lucent.com/work.html" specifies an HTTP connection with the server host www.lucent.com, from which is requested the Web page (HTML file) work.html.

UWU server: in connection with the present invention, a special Web server in charge of distributing statistics describing Web traffic.

Visit: a series of requests to a fixed Web server by a single person (through a browser), occurring contiguously in time.

Web master: the (typically technically trained) person in charge of keeping a host server and Web server program running.

Web page: multimedia information on a Web site. A Web page is typically an HTML document comprising other Web components, such as images.

Web server: a software program running on a server host, for handing out Web pages.

Web site: a collection of Web pages residing on one or multiple server hosts and accessible through the same hostname (such as, for example, www.lucent.com).

BRIEF DESCRIPTION OF DRAWINGS

Without restricting the full scope of this invention, the preferred form of this invention is illustrated in the following drawings:

FIG. 2 shows the system main web page;

FIG. 3a displays the different categories of Service Providers;

FIG. 3d displays a popup displaying a User's allotted call-time;

FIG. 3e shows a popup displaying the call-time time clock;

FIG. 7 displays Users' usage information.

DETAILED DESCRIPTION

Description The following description is demonstrative in nature and is not intended to limit the scope of the invention or its application of uses.

There are a number of significant design features and improvements incorporated within the invention.

The current invention is a system that will allow Users to contact Service Providers in specific fields. The Users will choose a Service Provider to contact. Once a Service Provider is chosen, a pop-up window will appear telling that User, among other things, if the Service Provider is available or not. If the Service Provider is available the system will connect the User with the Service Provider. The computer application that includes the User interface for this invention will henceforth be referred to as "the System 1." The system is network based and works on an Internet, Intranet and/or Wireless network.

Figure 1:
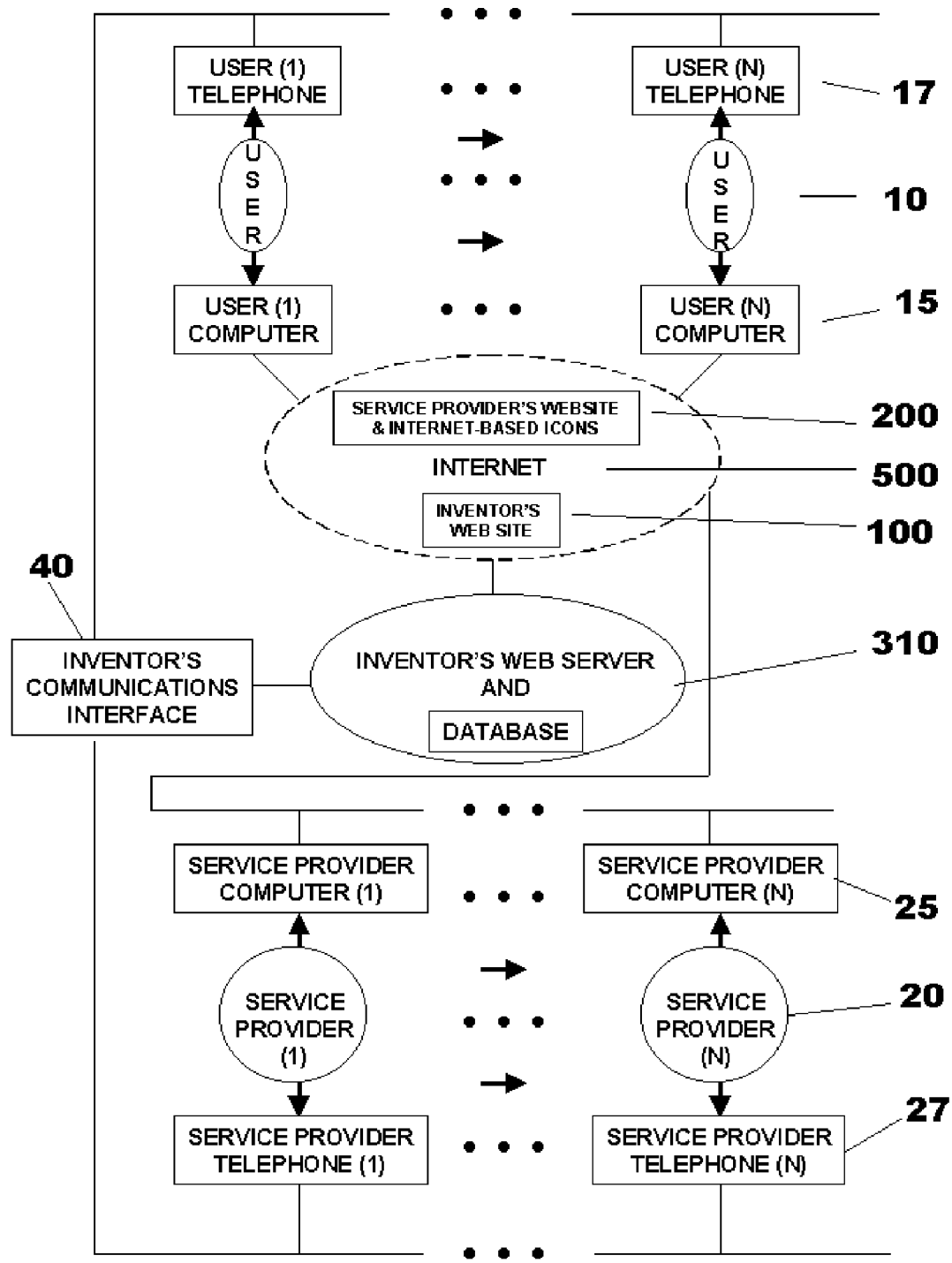
FIG. 1 shows an overview of how a User accesses the system through the Internet.

FIG. 1 illustrates a functional diagram of a computer network for World Wide Web 500 access to the System 1 from a plurality of Users 10 who access the System Web Server and Database 310 via the System Web Site 100 or a plurality of Service Provider Websites and Internet-based Icons 200 from the Users' Computers 15 and Telephones 17. Accessing the System Web Site 100 or the Service Provider Websites and Internet-base Icons 200 can be accomplished directly through a communication means such as a direct connection, an intranet, a local Internet Service Provider, often referred to as ISPs, or through an on-line Service Provider like COMPUSERVE, PRODIGY, AMERICAN ONLINE, etc. or Wireless devices using services like AT&T or VERIZON.

The Users 10 contact the System Web Server and Database 310 via the System Web Site 100 or the Service Provider Websites and Internet-base Icons 200 using an informational processing system (Client) capable of running an HTML compliant Web browser such as MICROSOFT'S INTERNET EXPLORER, NETSCAPE NAVIGATOR, LYNX and MOSAIC. A typical system that is used is a personal computer with an operating system such as WINDOWS 95, 98 or ME, NT, 2000 or LINUX running a Web browser. The exact hardware configuration of computer used by the Users 10, the brand of operating system or the brand of Web browser configuration is unimportant to understand this present invention. Those skilled in the art can conclude that any HTML (Hyper Text Markup Language) compatible Web browser is within the true spirit of this invention and the scope of the claims.

In one preferred embodiment of the invention, the Users 10 and Service Providers 20 can connect to the System Web Site 100 via the Internet 500 using their respective Computers 15 and 25 to register their accounts. In the preferred embodiment the system has numerous web pages. The information in the web pages is in HTML format via the HyperText Transport Protocol (http) and on Server System 310. The User System 310 allows the viewing of web pages and the inputting of User 10 and Service Provider 20 information to be stored in the System Database 310, through commonly used software referred to as a Web Browser, such as COMMUNICATOR available from NETSCAPE COMMUNICATIONS CORP.

or INTERNET EXPLORER available from MICROSOFT CORP. The system is capable of accessing web pages located on Server System 310.

The System 310 provides the ability to allow Service Providers 20 to embed Internet-based Icons within their websites, emails and online advertising banners 200 that are empowered to access the System Web Server Database 310. From these Internet-Based Icons 200, Users 10 are enabled to contact Service Providers 20.

The System 1 will connect the User 10 and the Service Provider 20 using a communication interface 40. In the preferred embodiment, once a User 10 decides on a Service Provider 20, the communication interface 40 will call both the User 10 and the Service Provider 20 to connect them so that the Service Provider 20 can assist the User 10. The communication interface 40 will call the User's telephone 17 and the Service Provider's telephone 27. This communication can also be done over the Internet or an instant messenger system.

In one preferred embodiment of the invention, the Users 10 connect to the Web site 100. The system 1 would have a standard home web page as shown in FIG. 2. This home web page would have information about the system 1. The main web page in the preferred embodiment would also have an icon that a User 10 would click for a demonstration of the system 1 as well as hypertexts to help and information web pages. The main web page would also include icons that would transfer a User 10 to Information, User Registration, Advisor Registration and Contact Us web pages. The home web page would also have hypertext to the standard home, legal notices, copyright notices, Privacy Policy, User Agreement, Advisor Agreement and Contact Us web pages.

FIG. 3a displays the system's webpage listing the different Service Providers 20 utilizing the System 1. These Service Providers 20 can be categorized into fields such as technology, business, personal, legal and metaphysical with subclasses or any other type of category that Users 10 will need advice on. The User 10 will chose one of the Service Providers' 20 listing which consists of hyper-text wording which will transfer the User 10 to the Service Provider's web presence that contains the Service Provider's Internet-based Icon 200 that is linked to the System 310.

Figure 3B:
FIG. 3b shows the listing of Service Providers.

In the preferred embodiment of the System 1, an agent of the System 1 will provide a industry-specific Internet-based directory, like FIG. 3b, whereat a User 10 can locate and choose from numerous Service Providers 20. If User 10 chooses to use a specific Service Provider he/she will use the curser to click the connect icon.

Figure 3C:
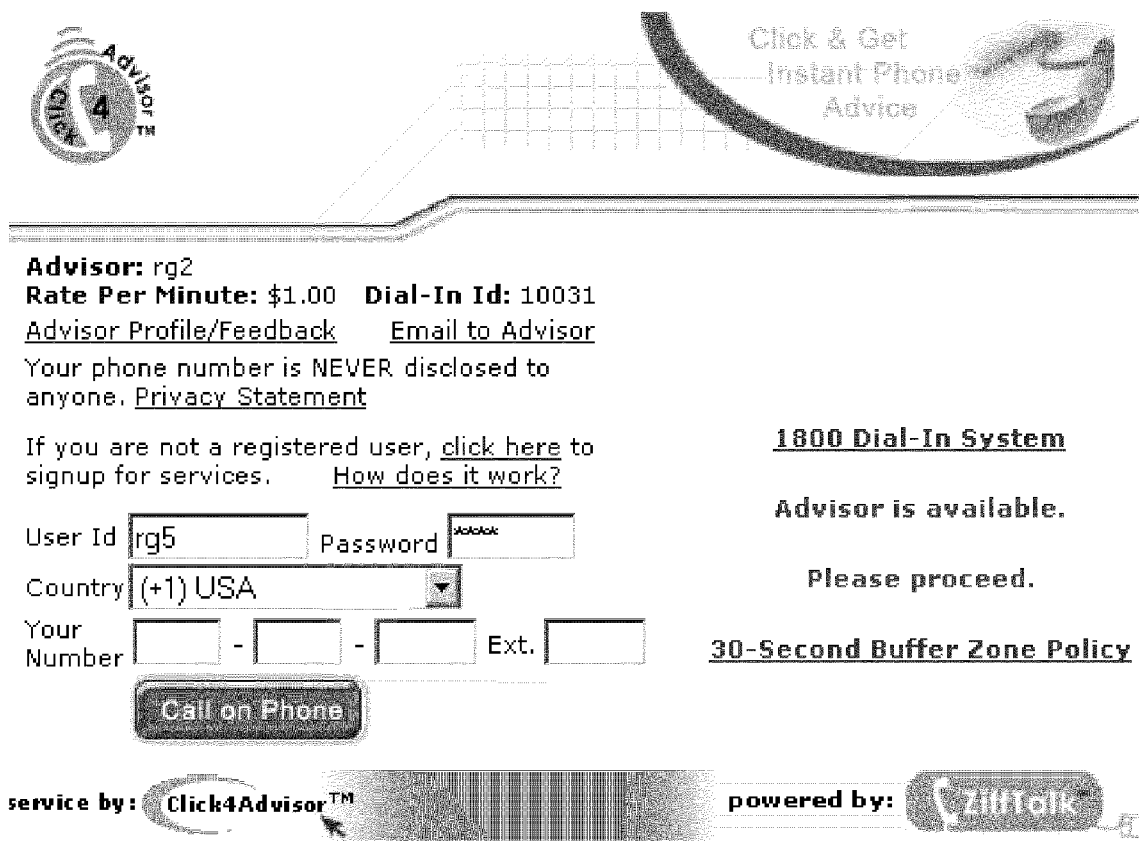
FIG. 3c displays a popup displaying the Service Provider's information.

The connect icon will bring up a popup window as shown in FIG. 3c. This popup window will display the Service Provider's system ID name, their rate of compensation, a hyper-text link to a summary about the Service Provider that includes feedback from previous Users, various other hyper-text links to policies, new User Registration, and descriptions of how the System 1 works, as well as text boxes for Users 10 to enter their System ID and Password and telephone number, and whether or not the Service Provider is available. If available, the User 10 fills in his telephone number and clicks the Call on Phone icon. The system will then contact the User 10 and the Service Providers through the phone lines connecting the two together.

Figure 4:
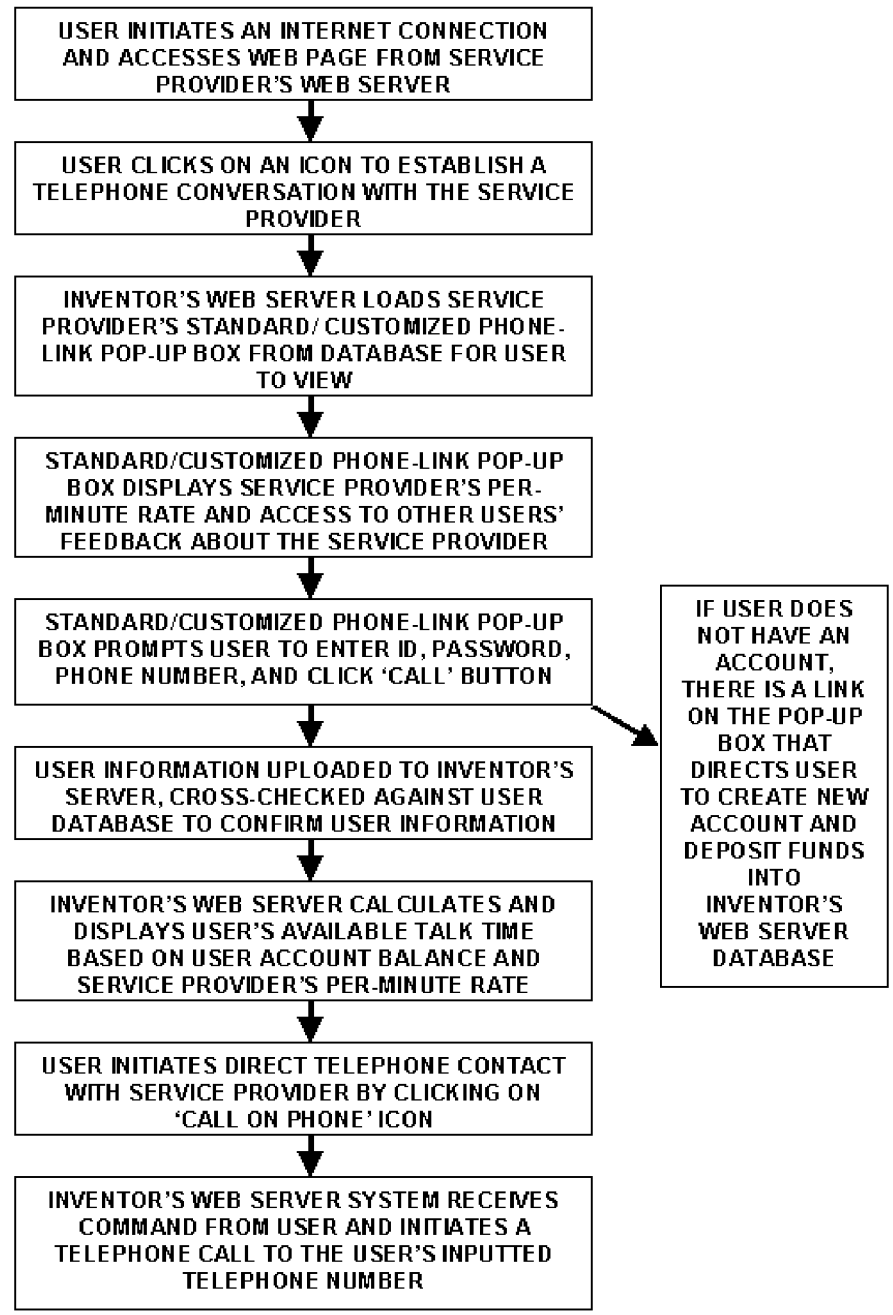
FIGS. 4 and 5 show the flowchart if a Service Provider is available.
Figure 5:
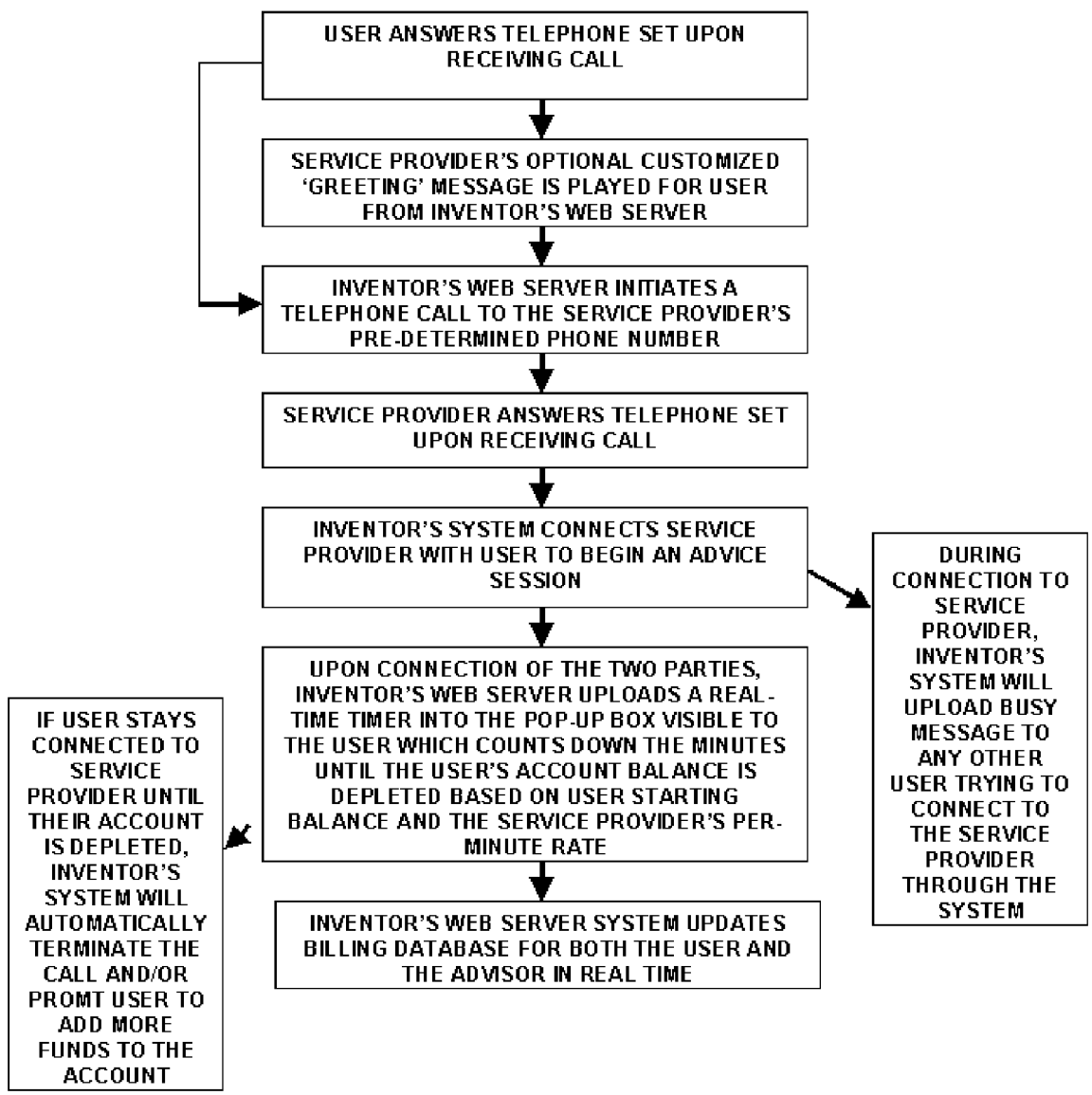

FIGS. 4 and 5 displays a system flowchart 2 of what happens if a Service Provider 20 is Available. First the User 10 initiates an Internet connection and accesses the Service Provider's web page or other web presence 200 from a web server. Next the User 10 clicks on an icon to initiate the establishment of a telephone conversation with the Service Provider 20. The system's web server 310 loads Service Provider's standard/customized phone-link pop-up box from system database 310 for the User 10 to view. The standard/customized phone-link pop-up window displays the Service Provider's system name, per-minute rate, availability message and access to system email service and to other Users' feedback about the Service Provider 20. The standard/customized phone-link pop-up window prompts User to enter ID, password, phone number, and click "call" button. If User 10 does not have an account, there is a link on the pop-up window that directs User 10 to create a new account and deposit funds into the system's web server database 310. The User information is uploaded to the system and crosschecked against the User database to confirm User information. The system's web server 310 then calculates and displays, as shown in FIG. 3d, in the pop-up window the User's available talk time based on User account balance and Service Provider's per-minute rate. The User 10 initiates direct telephone contact with Service Provider 20 by clicking on a "call on phone" icon. The system's Communications Interface 40 receives command from the User 10 and initiates a telephone call to the User's inputted telephone number. The User 10 answers telephone upon receiving the call The Service Provider's optional customized "greeting" message is played for User 10 from the system's communications interface 40. The system communications interface 40 then initiates a telephone call to the Service Provider's phone number as registered in the system database 310. The Service Provider 20 answers telephone set upon receiving call. The communications interface 40 connects the Service Provider 20 with User 10 to begin an advice session.

During the connection to the Service Provider 20, the system 1 will upload busy message into the pop-up window to any other User 10 trying to connect to the Service Provider 20 through the system 1.

Upon connection of the two parties, the system 1 uploads a real-time timer into the pop-up window, as shown in FIG. 3e, visible to the User 10 which counts down the minutes until the User's account balance is depleted based on User 10 starting balance and the Service Provider's per-minute rate. If the User 10 stays connected to Service Provider 20 until their account is depleted, the system 1 will automatically terminate the call and/or prompt User to add more funds to the account. The system 1 updates the billing database for both the User 10 and the Service Provider 20 in real time.

Figure 3F:
FIG. 3f displays a popup displaying a busy message.
Figure 3G:
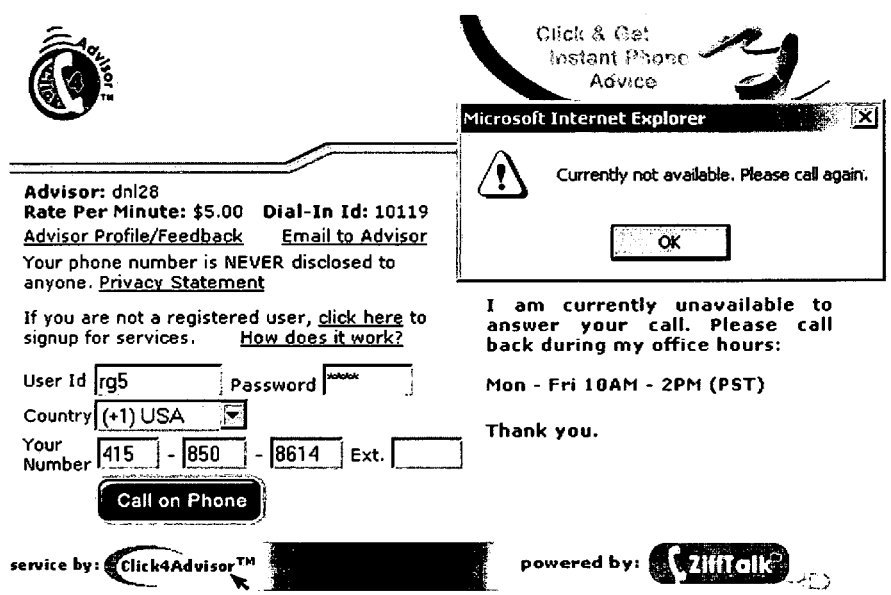
FIG. 3g displays a popup displaying a not available message.
Figure 6:
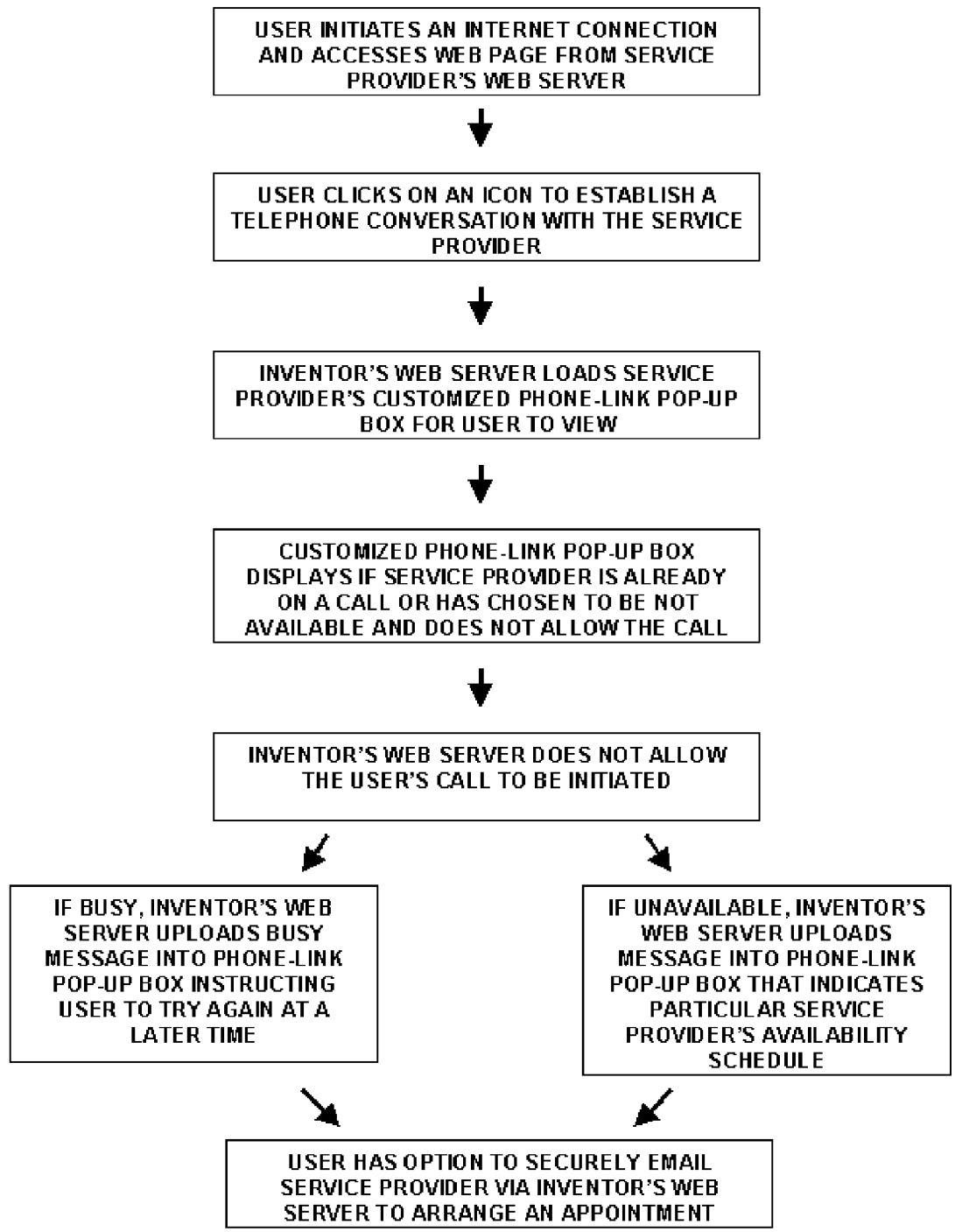
FIG. 6 shows the flowchart if a Service Provider is unavailable.

FIG. 6 displays a system flowchart of how the system 1 processes when a Service Provider 20 is Not Available. First, the User 10 initiates an Internet connection and accesses the Service Provider's web page or other web presence 200 from the a web server. Next, the User 10 clicks on an icon to establish a telephone conversation with the Service Provider 20. The system 1 loads the Service Provider's standard/customized phone-link pop-up window from the system web server database 310 for User 10 to view. The system 1 checks the web server database 310 to determine whether the Service Provider 20 has predetermined to be Not Available at this time and then with the communication interface 40 to determine if Service Provider 20 is already on a call. If either is the case, the system 1 does not allow the communications interface 40 to initiate the User's intended call. Additionally, the web server 310 generates and displays in the standard/customized phone-link pop-up window that the Service Provider 20 is busy on another call or has chosen to be Not Available at this time. If Busy, the system 1 uploads a standard busy message, as shown in FIG. 3f, into phone-link pop-up window instructing User to try again at a later time. If Not Available, the system 1 uploads a standard or an optional, customized message, an example shown in FIG. 3g, into phone-link pop-up window that can indicate the Service Provider's availability schedule. The User 10 will then have the option to privately and securely e-mail Service Provider 20 via the system 1 to arrange an appointment.

FIG. 7 displays User 10 usage information. The system 1 will display this information to assist the User 10. The web page will have the date/time, adviser's name and service description, call duration, amount charged, Service Providers' payout ID, the status, feedback and details. This information is used by the User 10 to manage his or her account. The account is initially funded by a deposit account of the User 10.

The website 100 will have many of the components described above. The site 100 will ask for the Users 10 to enter their system name and password to access their account. Once on the account, the User will be able to connect to any new and different Service Providers 20 that are registered with the system 1. The site will also create a feedback system for the Users 10 to reference based on a history of past feedback information on Service Providers 20 by other Users 10. The User 10 will give feedback to the system 1 regarding the Service Provider 20 based on the service provided. The system 1 will prompt a User 10 provide such feedback.

The system 1 is set to run on a computing device. A computing device on which the present invention can run would be comprised of a CPU, Hard Disk Drive, Keyboard, Monitor, CPU Main Memory and a portion of main memory where the system resides and executes. A printer can also be included. Any general-purpose computer with an appropriate amount of storage space is suitable for this purpose. Computer Devices like this are well known in the art and are not pertinent to the invention. The system 1 is set to run on telecommunications sets. Telecommunications sets can include standard landline telephone sets utilizing the Publicly Switched Telephone Network (PSTN) or any variations thereof, any kind of cellular telephone set utilizing any cellular call processing technology, as well as any telecommunications sets utilizing Voice over Internet Protocol (VoIP) voice communications technology. Telecommunications sets like this are well known in the art and are not pertinent to the invention. The system 1 can also be written in a number of different languages and run on a number of different operating systems and platforms.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of connecting two parties in real time, the method comprising:
   providing an Internet platform wherein said Internet platform is an Internet-based system used to initiate a live conversation with a Service Provider via a computer or other electronic mobile device over the Internet;
   providing real-time communication between two or more parties via the Internet platform;
   having a User click on an internet-based icon to initiate a live conversation with a Service Provider;
   generating a pop-up window with information about said Service Provider; checking to see if the Service Provider is available;
   connecting said User with said Service Provider, if available, via the Internet platform;
   initiating a first call to the User, receiving a first phone call by the User at his desired phone number from the Internet platform;
   answering the first call by the User from the Internet platform,
   initiating a second call to the Service Provider in response to the answered first call by the User, from the Internet platform;
   answering the second call from the Internet platform by the Service Provider;
   connecting the parties in a call via Internet platform;
   tracking call information during the duration of the call by the Internet platform;
   alerting said User if said Service Provider is not available;
   prompting said User to send an email to the Service Provider if the Internet platform determines said Service Provider is busy or unavailable;
   providing input means, via said Internet Platform, for the User to create and send said email
   providing transaction settlement functions between two or more connected parties via the Internet platform;
   extracting User real-time account balance information from a System Database;
   extracting Service Provider per minute compensation rate from the System Database;
   dividing the User account balance total by the Service provider per minute compensation rate;
   determining total minutes said User can connect to said Service provider until said User's account balance reaches zero;
   displaying this information to said User textually in pop-up window the moment before said User connects to said Service provider; and
   displaying a graphical timer in said pop-up window, once said User connects to said Service provider, begins counting down the minutes remaining for the User to be connected to the Service provider until said User's account balance is depleted and correspondingly their connection terminated.

2. The method as described in claim 1, further comprising an Internet platform having said pop-up window prompting said User to enter their phone number to make said connection providing means for making a connection and transferring speech and text.

3. The method as described in claim 1, further comprising generating a message for the User in a pop-up window via the Internet platform when said Service Provider is not available.

4. The method as described in claim 1, further comprising allowing said Service Provider to enter their hours of availability to be visually displayed to Users via the Internet platform.

5. The method as described in claim 1, further comprising displaying said Service Provider's hours of availability within a pop-up window via the Internet platform.

6. The method as described in claim 5, further comprising denying said connection if a User tries to initiate a connection during the hours said Service Provider is scheduled to be not available.

7. The method as described in claim 1, further comprising displaying in a pop-up window via the Internet platform that said Service Provider is currently busy on another call if said Service Provider is currently on another system call.

8. The method as described in claim 7, further comprising denying said connection if a User tries to initiate a connection while said Service Provider is busy on another call.

9. The method as described in claim 1, further including displaying a compensation rate in a pop-up window via the Internet platform, based on a period of time, for each Service Provider.

10. The method as described in claim 1, further including displaying a text link in a pop-up window via the Internet platform to a new pop-up window displaying a Service Providers' profile and history of previous Users' feedback.

11. The method as described in claim 1, wherein the set of Service Providers is provided in response to a category selection via the Internet platform.

12. The method as described in claim 1, further comprising, after the connection has ended, prompting said User to provide feedback on said Service Provider regarding the quality of said Service Provider's service via the Internet platform.

13. The method as described in claim 1, further comprising:
    setting up an account for the Service Providers; and
    crediting the account for an amount based upon how long the connection is maintained.

14. The method as described in claim 13, further comprising:
    setting up an account for the Service Providers; and
    crediting the account for an amount based upon how long the telephonic connection is maintained minus a fee.

15. The method as described in claim 1, further comprising:
    setting up a consumer account in the system for the User, wherein setting up the consumer account includes obtaining credit card information from the consumer; and
    allowing User to make a deposit to their consumer account.

16. The method as described in claim 1, further comprising:
    monitoring how long the telephonic connection is maintained between said User and said Service Provider; and
    deducting from said User consumer account an amount based upon how long the telephonic connection is maintained.

17. The method as described in claim 1, further comprising a hypertext link in a pop-up window via the Internet platform directing Users to make a deposit to their account.

\* \* \* \* \*